No. 642,488. Patented Jan. 30, 1900.
E. R. POST.
NUT LOCK.
(Application filed Nov. 11, 1899.)
(No Model.)
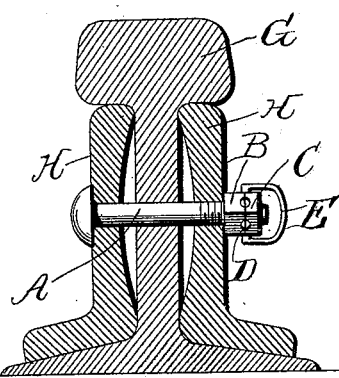
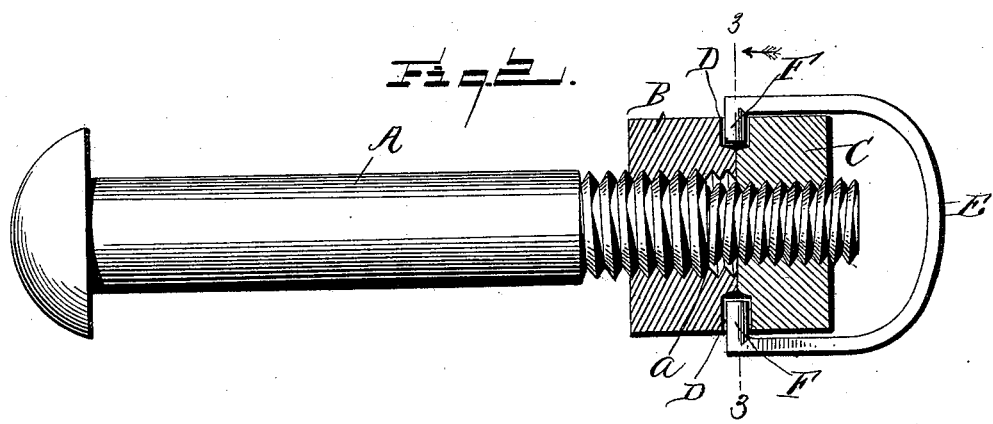
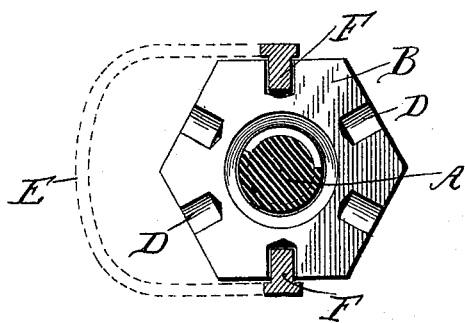
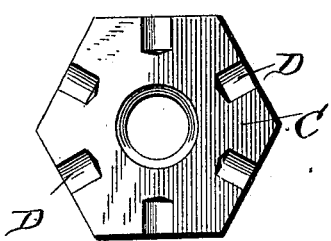
Witnesses:
L. C. Hills
E. H. Bond
Inventor
Edward R. Post,
By Albert Popkins
His Attorney

UNITED STATES PATENT OFFICE.

EDWARD R. POST, OF OTTAWA, OHIO, ASSIGNOR OF ONE-HALF TO EDWARD S. GRISE, OF SAME PLACE.

NUT-LOCK.

SPECIFICATION forming part of Letters Patent No. 642,488, dated January 30, 1900.

Application filed November 11, 1899. Serial No. 736,672. (No model.)

*To all whom it may concern:*

Be it known that I, EDWARD R. POST, a citizen of the United States, residing at Ottawa, in the county of Putnam and State of Ohio, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in nut-locks of that class in which is employed a bolt with right and left hand screw-threads and two nuts engaging therewith and means for locking the two nuts against retrograde movement.

The present invention has for its object, among others, to improve upon this class of nut-locks and to provide a simple yet efficient means for locking the nuts with a spring tension, so as to permit of the necessary movement caused by vibration or shock occasioned by the passage of the trains over the rails and yet without danger of the nuts becoming loosened. The nuts are provided upon their adjacent faces with openings, which, however, do not extend entirely into the bore of the nut, to receive the points or projections on the ends of the spring bow or yoke which serves to lock the nuts. In this way the points or projections do not engage the threads of the bolt and the latter are not injured, as they are liable to be when the nut-locking means engage the said threads of the bolt.

Other objects and advantages of the invention will hereinafter appear and the novel features thereof will be specifically defined by the appended claims.

The invention is clearly illustrated in the accompanying drawings, which with the letters of reference marked thereon form a part of this specification, and in which—

Figure 1 is a vertical transverse section through a rail with my improvement applied thereto. Fig. 2 is an enlarged view of the bolt, nuts, and locking-bow, the nuts being shown in section. Fig. 3 is a cross-section taken on the line 3 3 of Fig. 2, looking in the direction of the arrows. Fig. 4 is a view of the outer nut, looking at the inner face thereof.

Like letters of reference indicate like parts throughout the several views.

Referring now to the details of the drawings by letter, A designates a bolt provided with right and left hand threads, as seen most clearly in Fig. 2, in this instance the inner threads being shown as right and the outer as left handed. There is a shoulder *a* formed at the junction of the two threads, as seen in Fig. 2.

B is the nut engaging the right-hand threads and C is the nut engaging the left-hand threads. They are preferably of like exterior dimensions, as shown. Each nut is formed upon one face with a plurality of depressions D, which extend from the outer periphery to a point more or less removed from the bore or passage through the nut, as seen clearly in Figs. 3 and 4. The depth of these depressions or cavities is not essential, except that they must not extend clear through the nut in order that the inner ends of the projections or points on the locking device shall not come in contact with the threads of the bolt.

E is the locking device. It is in the form of a bow or yoke with its ends extending inward toward each other to form the projections or points F, as seen clearly in Figs. 2 and 3.

The improved nut-lock is applicable for use in various places. In the present instance I have shown it in Fig. 1 in connection with a railroad-rail G and fish-plates H H. The manner of use will be apparent. The fish-plates being in position, the bolt is passed through the coincident openings in the said plates and in the rail and then the nut B and afterward the nut C are applied and screwed up, it being understood that the nuts are applied with the depressions or cavities D upon adjacent faces, as seen in Fig. 2, so that when thus in position the opposing depressions of the two nuts form a socket or opening, part in one nut and part in the other, and then the locking-bow E is applied. This is done by springing the ends apart till the projections will enter the diametrically opposite openings in the two nuts, as seen in Fig. 3, when the spring of the material will cause them to be forced into the openings, and by this means the nuts will be bound together, and as one must turn in one direction and the other in the opposite direction in order to be loosened it is evident that they will be securely locked against such movement. The spring of the bow will permit of the movements occasioned by the vibrations or shock by the passage of the trains and will compensate therefor.

To permit of removal of the nuts, all that it is necessary to do is to spring the ends or one end of the bow out of the openings in the nuts and remove the bow, when the outer nut can be removed or adjusted to the desired position. A suitable tool may be provided for applying and removing the bow.

What I claim as new is—

1. The combination with a bolt with right and left threads, of nuts engaging the same, and a spring-fastener having its ends engaged in corresponding openings in the adjacent faces of diametrically opposite sides of said nuts to lock them against movement, as set forth.

2. The combination with a bolt with right and left threads, of nuts engaging the said threads and having corresponding openings upon their adjacent faces, and a spring-bow having projections on its ends engaging in the openings in the nuts upon diametrically opposite sides thereof without engagement with the threads of the bolt, as set forth.

3. A bolt with right and left threads, nuts engaging said threads and having upon their adjacent faces corresponding openings extending toward the center, and a spring-bow having its ends bent at right angles to the length of its sides and sprung into diametrically opposite openings in the adjacent faces of the nuts, the bow being of a length to swing over the outer end of the bolt, substantially as shown and described.

In testimony whereof I affix my signature in presence of two witnesses.

EDWARD R. POST.

Witnesses:
FRANK D. BLACKISTONE,
ALBERT POPKINS.